US008322273B2

(12) United States Patent
Coudurier et al.

(10) Patent No.: US 8,322,273 B2
(45) Date of Patent: Dec. 4, 2012

(54) EASY-CLEAN COOKING SURFACE AND DOMESTIC ELECTRIC ARTICLE HAVING SUCH A SURFACE

(75) Inventors: Alain Coudurier, Albens (FR); Stéphane Tuffe, Cognin (FR)

(73) Assignee: SEB S.A., Ecully (FR)

( * ) Notice: Subject to any disclaimer, the term of this patent is extended or adjusted under 35 U.S.C. 154(b) by 926 days.

(21) Appl. No.: 12/279,317

(22) PCT Filed: Jan. 26, 2007

(86) PCT No.: PCT/FR2007/000157
§ 371 (c)(1),
(2), (4) Date: Aug. 13, 2008

(87) PCT Pub. No.: WO2007/093682
PCT Pub. Date: Aug. 23, 2007

(65) Prior Publication Data
US 2009/0165656 A1    Jul. 2, 2009

(30) Foreign Application Priority Data
Feb. 13, 2006 (FR) ...................................... 06 01249

(51) Int. Cl.
*A47J 37/10* (2006.01)

(52) U.S. Cl. ......... 99/422; 126/39 H; 126/37 A; 126/22; 126/144; 126/211; 126/337 R

(58) Field of Classification Search .................... 99/422; 126/39 H, 37 A, 22, 144, 211, 337 R
See application file for complete search history.

(56) References Cited

U.S. PATENT DOCUMENTS

| 3,970,627 | A | * | 7/1976 | Seymus | 523/205 |
| 6,214,401 | B1 | * | 4/2001 | Chaput et al. | 426/523 |
| 6,221,513 | B1 | * | 4/2001 | Lasater | 428/629 |
| 2002/0102400 | A1 | * | 8/2002 | Gorokhovsky et al. | 428/336 |
| 2004/0261932 | A1 | * | 12/2004 | Buffard et al. | 156/89.11 |

FOREIGN PATENT DOCUMENTS

| FR | 2848797 A1 | 6/2004 |
| GB | 1153823 A | 5/1969 |
| JP | H01-14775 A | 3/1989 |
| JP | 2000-144096 A | 5/2000 |

* cited by examiner

*Primary Examiner* — Benjamin Layno
(74) *Attorney, Agent, or Firm* — Browdy and Neimark, PLLC

(57) ABSTRACT

The present invention relates to a food-cooking surface for a kitchen utensil or cooker, characterized in that the cooking surface is a coating containing at least 30% niobium. Advantageously, the coating contains zirconium or titanium, with a content of less than 70%.

20 Claims, No Drawings

EASY-CLEAN COOKING SURFACE AND DOMESTIC ELECTRIC ARTICLE HAVING SUCH A SURFACE

The present invention relates to the field of articles for the preparation and cooking of food and more particularly the cooking surface of these articles in contact with the food to be processed.

For many years, significant efforts have been developed to facilitate the daily preparation of meals. Among the notable progress, coatings based on fluorocarbonated polymers as non-stick coatings in kitchen utensils have grown rapidly since the late 1950s. Such coatings are known worldwide since the process outlined in the patent FR 1120749 allowed a secure attachment of such coatings on various metals, such as aluminum.

However, such coatings remain fragile and resist scratching poorly. Thus, techniques have been developed to mechanically strengthen the layer on its support. Numerous improvement patents describe methods and means to increase the resistance of such coatings to scratching, by acting on the coating and/or on the substrate. Nevertheless, such coatings remain sensitive to the repeated use of sharp or pointed metallic materials, such as knives or forks.

At the same time, developments have been carried out on mechanically resistant surfaces for which it has been attempted to improve the ease of cleaning. Metal depositions, such as chromium plating on stainless steel, quasi-crystals, or non-metallics (silicates, ...) have thus appeared. The results remain disappointing, especially in comparison with coatings of the PTFE type.

There is also known, from the document FR 2 848 797, a cooking surface composed mainly of zirconium metal, surface that has a very good hardness, when the layer is nitrided or carburized, presenting satisfactory ease of cleaning but without reaching the ease of cleaning of layers of the PTFE type.

This invention aims at remedying the above-mentioned drawbacks of the prior art, by providing a cooking surface with improved ease of cleaning characteristics, presenting over a long time period a reduction in the adherence of food during cooking, as well as after cooking, during cleaning, corrosion resistance, while presenting a good mechanical strength, including a high hardness.

The present invention is achieved by a food cooking surface for kitchen utensils or cooking appliances, characterized in that this cooking surface is a deposit containing at least 30% of niobium.

The contents indicated are contents by weight.

Niobium is particularly known for its high potential to be hardened, its high melting point, as well as its resistance to chemical agents. It is mainly used in steel making, particularly in the form of carbide, and in the medical field, niobium being considered a biocompatible element.

In a surprising manner, it was found, during tests, that deposits, or layers, containing a significant content of niobium, or even a pure niobium surface, also showed ease of cleaning properties when such surfaces were used as a cooking surface and foodstuffs remained attached to the surface, for example, after burning on of the products that were cooked. This ease of cleaning can be expressed by the possibility of easily removing elements charred on the cooking surface.

Preferably, the deposit contains zirconium or titanium, in a content of less than 70%.

The use of zirconium or titanium allows highly varied coating shades, or tints, to be obtained, which it is not possible to obtain only with niobium. It is then possible to define a coating color to identify clearly, for the user, that the coating used is specific and corresponds to an "easy to clean" coating.

One can even consider different colors for different uses (eggs, fish, meat, . . . ), so that users easily identify the proper cooking surface to cook a given type of food.

Moreover, the use of zirconium or titanium helps to maintain the characteristics of ease of cleaning and hardness, and this even for high proportions of these elements.

The preparation of the cooking surface consists of a physical vapor deposition of the constituents on a substrate, from one or more solid target(s). Broadly speaking, all of the techniques of physical vapor deposition may be used. The thickness of the deposits are between 2 and 10 µm.

This implementation has the advantage of using a small amount of material and of being able to adjust a low thickness of material on the substrate to achieve the cooking surface. This deposition technique allows, moreover, to obtain deposits having strong cohesion with the substrate on which they are deposited. The risks of detachment of the deposit during use are minimized.

Advantageously, the preparation includes a step of carburizing and/or nitriding at least one of the constituents. Such a step can be carried out before depositing, the constituents being preliminarily carburized or nitrided, or during deposition by the introduction of reactive gases into the deposition chamber.

Such steps can considerably increase the hardness of the cooking surface, while bringing diversity in the shades obtained, mainly by working on the stoichiometry of the nitride, the carbide or the carbonitride of zirconium or titanium, carbonitrides being known for their high hardness.

In a specific mode of development, a first nitriding step will be conducted before a later step of carburization or carbonitriding on the surface, said nitriding step allowing a good adherence of the layer of carbide or carbonitride. It is indeed known moreover, that it is very difficult to adhere a layer of carbide or carbonitride of certain compounds used on a substrate of the aluminum or stainless steel type without an intermediate layer. In addition, the speed of deposition of a layer of carbide is much greater than the speed of deposition of a layer of nitride.

Such compounds combine the properties of ease of cleaning with the increased potential of hardening, coloration and resistance to corrosion of the layers of nitride, carbide and carbonitride of zirconium, titanium and niobium. The hardnesses obtained can go up to 2400 Vickers for a carbide or nitride of zirconium.

Advantageously, a deposited metallic layer of different constituents is achieved before the phase of carburization and/or nitriding. Such a sequence can improve the resistance to corrosion and provides a better adherence of the layer than a direct deposit of carbide, nitride or carbonitride of the components.

In addition, the deposition of a metallic layer is faster than the deposition of the same layer with a reactive gas, which allows a greater overall speed of the deposition.

According to a preferred mode of development, the deposition is carried out from a target obtained by assembling on a conductive substrate one or more sheet(s) or plate(s) of a material having the desired composition. This can be a monobloc or mosaic target.

Sheets or plates are preferentially obtained by lamination, or rolling. Other techniques can be used in connection with the invention: sintering of powder, thermal projection of powder, or even products produced by casting.

These targets thus constitute the source of materials to be deposited on the cooking surface.

The substrate may comprise one or more metal sheet(s) of the following materials: aluminum, stainless steel, iron, steel, copper.

Other benefits stemming from the tests will appear from reading the description that will follow, in connection with several illustrative examples of the present invention given as non-limiting examples.

The various examples of carrying out the invention relate to deposition on a stainless steel substrate by PVD, of a compound containing to a significant extent niobium. All of the substrates used are prepared in an analogous manner, by undergoing mechanical emerying and/or mechanical polishing, possibly followed by a mechanical preparation of the shot or microbead blasting type, then an ionic cleaning.

The various deposits provided are the following:

C1: niobium carbide

C2: niobium nitride

C3: zirconium (50%) and niobium (50%). After the deposition of constituents, the layer has undergone a nitriding.

The system for evaluation of ease of cleaning can quantify the capacity of a cooking surface to return to its original appearance after use. The evaluation system includes the following steps:

the surface is covered locally with a mixture of food of known composition, this mixture is burned in an oven under defined conditions, for example 210° C. for 20 minutes, after cooling, the surface is put to soak for a controlled time in a mixture of water and detergent an abrasive pad is then applied under a constraint defined with the aid of an abrading appliance (plynometer) to the soiled surface in a to and fro movement for a given number of cycles, the percentage of the surface that is properly cleaned is noted and characterizes the ease of cleaning of the cooking surface.

Tests carried out on different types of surface thus allow a comparative evaluation of the quality of the surfaces as regards their ease of cleaning.

Of course, the tests are conducted while respecting the same parameters for each step of the evaluation system: the same food mixture, the same surface for applying the mixture food, the same carbonization temperature, . . .

The following comparative table shows the results obtained on three different cooking surfaces, namely a polished stainless steel, a quasi-crystals, and a cobalt/zirconium alloy according to one of the cited eutectics, deposited on stainless steel, nitrided then carbonitrided, as previously described, after polishing, in a severe test with a food composition based on milk and rice known to be difficult to remove once burned. Such a test is used to highlight the differences between the quality of cleaning of the surfaces.

|  | Polished stainless steel | Quasi-crystals | C1 | C2 | C3 |
|---|---|---|---|---|---|
| Quantity of carbonized residue removed | 50% | 60% | 100% | 100% | 95% |

The table shows the excellent properties of the C1, C2 and C3 layers deposited on stainless steel, and notably the results compared to other cooking surfaces. Other tests conducted on an aluminum base show similar results.

It is to be noted that the number of abrasion cycles on the plynometer was set at 18. This reduced number of cycles makes very obvious the quality of ease of cleaning of the surface according to the invention since no more than 5% of the surface remains soiled after 18 to and fro movements of the abrasive pad.

Repetitive tests after complete cleaning of the surface show that the ease of cleaning of the alloy provided is not altered.

This invention is not limited to examples of achievement mentioned. One may indeed modify to a large extent the amount of zirconium present in the cooking surface, albeit slightly reducing the hardness, but permitting to accentuate and to provide more diversified coating tints.

Similarly, by varying the rate of nitriding, it is possible to obtain tints different from the metallic appearance presented by stainless steel. The shades yellow, ochre, amber, anthracite, smoky grey, purple, blue, . . . can thus be obtained.

This phase of coloration by nitriding may also be carried out after the PVD deposition phase. For example, the part, with its deposit may be post-treated in an oven, in a nitrogen atmosphere, with possible addition of oxygen.

The element added to the niobium may also be titanium in order to give it a coloration different from that of stainless steel.

The invention claimed is:

1. Deposit or layer on a substrate that is part of a kitchen utensil or cooking appliance, wherein said deposit or layer contains (1) at least 30% of niobium, and (2) zirconium or titanium in a content of less than 70%, said deposit or layer has an exposed boundary surface that constitutes a cooking surface in direct contact with food when the food is being cooked, and niobium is present at said exposed boundary surface.

2. Deposit or layer for kitchen utensil or cooking appliance according to claim 1, wherein the formation of said deposit or layer comprises a physical vapor deposition of the niobium and zirconium or titanium on the substrate, from one or more solid targets.

3. Deposit or layer for kitchen utensil or cooking appliance according to claim 2, wherein the substrate is composed of one or more metal sheet(s) of the following materials: aluminum, stainless steel, cast iron, steel, copper.

4. Deposit or layer for kitchen utensil or cooking appliance according to claim 1, the formation of which comprises depositing the constituents on the substrate and carburizing and/or nitriding at least one of the constituents, before or during their deposition.

5. Deposit or layer for kitchen utensil or cooking appliance according to claim 1, wherein the thickness of the deposit or layer is between 2 and 10 μm.

6. Deposit or layer for kitchen utensil or cooking appliance according to claim 5, wherein the deposit or layer is formed by deposition from a target obtained by assembling on a conductive substrate one or more sheet(s) or plate(s) of material having the composition sought, said sheets or plates being obtained either by rolling or by sintering of powder or thermal projection of powder, or by casting.

7. Deposit or layer for kitchen utensil or cooking appliance according to claim 6, wherein the formation of said deposit or layer comprises a physical vapor deposition of the constituents on the substrate, from one or more solid targets.

8. Deposit or layer for kitchen utensil or cooking appliance according to claim 5, wherein the formation of said deposit or layer comprises a physical vapor deposition of the constituents on the substrate, from one or more solid targets.

9. Deposit or layer for kitchen utensil or cooking appliance according to claim 1, wherein:
- the formation of the deposit or layer comprises a physical vapor deposition of a metallic layer of niobium and zirconium or titanium on a substrate, from one or more solid targets, and by a step of carburizing and/or nitriding at least one of the constituents, after the deposition;
- the thickness of the deposit made is between 2 and 10 μm;
- the one or more solid targets are obtained by assembling on a conductive substrate one or more sheet(s) or plate(s) of material having the composition sought, said sheets or plates being obtained either by rolling or by sintering of powder or thermal projection of powder, or by casting; and
- the substrate is composed of one or more metal sheet(s) of the following materials: aluminum, stainless steel, cast iron, steel, copper.

10. Deposit or layer for kitchen utensil or cooking appliance according to claim 1, wherein the deposit or layer is formed by depositing a metal layer consisting of 50% niobium and 50% zirconium, and then nitriding the metal layer.

11. Metal-containing deposit or layer on a substrate that is part of a kitchen utensil or cooking appliance, wherein said deposit or layer contains at least 30% of niobium and at least one other constituent, said deposit or layer has an exposed boundary surface that constitutes a cooking surface in direct contact with food when the food is being cooked, and niobium is present at said exposed boundary surface, wherein a metallic deposit layer including niobium is produced, followed by forming a carburized and/or nitrided layer, including niobium, such that niobium carbide and/or nitride is present at the exposed boundary surface.

12. Metal-containing or layer for kitchen utensil or cooking appliance according to claim 11, wherein said deposit or layer contains zirconium or titanium in a content of less than 70%.

13. Metal-containing deposit or layer for kitchen utensil or cooking appliance according to claim 11, wherein the formation of said deposit or layer comprises a physical vapor deposition of the constituents on the substrate, from one or more solid targets.

14. Metal-containing deposit or layer for kitchen utensil or cooking appliance according to claim 13, wherein the substrate is composed of one or more metal sheets of the following materials: aluminum, stainless steel, cast iron, steel, copper.

15. Metal-containing deposit or layer for kitchen utensil or cooking appliance according to claim 14, wherein the formation of said deposit or layer comprises a physical vapor deposition of the constituents on the substrate, from one or more solid targets.

16. Metal-containing or layer for kitchen utensil or cooking appliance according to claim 11, wherein the formation of the carburized and/or nitrided layer comprises carburizing and/or nitriding niobium, possibly with the at least one other constituent, before or during its/their deposition on the metallic deposit layer.

17. Metal-containing deposit or layer for kitchen utensil or cooking appliance according to claim 11, wherein the thickness of the deposit or layer is between 2 and 10 μm.

18. Metal-containing deposit or layer for kitchen utensil or cooking appliance according to claim 17, wherein the deposit or layer is formed by deposition from a target obtained by assembling on a conductive substrate one or more sheet(s) or plate(s) of material having the composition sought, said sheets or plates being obtained either by rolling or by sintering of powder or thermal projection of powder, or by casting.

19. Metal-containing deposit or layer for kitchen utensil or cooking appliance according to claim 18, wherein the formation of said deposit or layer comprises a physical vapor deposition of the constituents on the substrate, from one or more solid targets.

20. Metal-containing deposit or layer on a substrate that is part of a kitchen utensil or cooking appliance, wherein said deposit or layer consists of metallic niobium, said deposit or layer has an exposed boundary surface that constitutes a cooking surface in direct contact with food when the food is being cooked, and niobium is present at said exposed boundary surface.

\* \* \* \* \*